United States Patent [19]

Tanaka

[11] Patent Number: 5,715,351
[45] Date of Patent: Feb. 3, 1998

[54] DOUBLE DECK VIDEO CASSETTE TAPE RECORDER WITH VIDEO SIGNAL PROCESSING CIRCUIT

[75] Inventor: Sumio Tanaka, Tokyo, Japan

[73] Assignee: LG Electronics, Inc., Seoul, Rep. of Korea

[21] Appl. No.: 625,036

[22] Filed: Mar. 29, 1996

[30] Foreign Application Priority Data

Mar. 31, 1995 [JP] Japan ................... 7-076331

[51] Int. Cl.$^6$ .................................. H04N 9/79
[52] U.S. Cl. .......................... 386/44; 386/37
[58] Field of Search ................... 386/1, 26, 31, 386/35, 44, 52, 37, 28, 29, 17, 4; 360/13.1, 15, 27, 30; H04N 9/79

[56] References Cited

U.S. PATENT DOCUMENTS

| | | | |
|---|---|---|---|
| 4,864,421 | 9/1989 | Morioka et al. | 386/44 |
| 5,057,934 | 10/1991 | Yun et al. | |
| 5,075,803 | 12/1991 | Moro et al. | |
| 5,121,266 | 6/1992 | Ito et al. | 360/27 |
| 5,212,561 | 5/1993 | Kim | 386/11 |
| 5,216,552 | 6/1993 | Dunlap et al. | 386/96 |
| 5,223,943 | 6/1993 | Imura | |
| 5,223,954 | 6/1993 | Honda et al. | 360/27 |

FOREIGN PATENT DOCUMENTS

| | | |
|---|---|---|
| 3920591 | 1/1991 | Germany . |
| 4117974 | 12/1992 | Germany . |

OTHER PUBLICATIONS

Patent Abstracts of Japan, vol. 13, No. 594 (E-867) 27 Dec. 1989 & MP-A-01 248896.
Patent Abstracts of Japan, vol. 9, No. 189 (E-333) 6 Aug. 1985 & JP-A-60 057791.
Patent Abstracts of Japan, vol. 17, No. 354 (P-1567) 5 Jul. 1993 & JP-A-05 047107.

*Primary Examiner*—Thai Tran
*Assistant Examiner*—Huy Nguyen

[57] ABSTRACT

An video signal processing circuit of a double deck VCR capable of preventing a deterioration of picture when dubbing, which includes a reproducing video cassette tape recorder and a recording video cassette tape recorder disposed in a single body, wherein the reproducing VCR transmits a luminance signal and a chrominance signal, respectively, to the recording VCR and includes a luminance reproduction processing circuit generating a high band detection signal to be transmitted to the recording VCR, and the recording VCR includes a first switch for switching an input signal and an output signal of a low pass filter for luminance signal in response to the high band detection signal so that the output of the low pass filter is outputted to a luminance signal recording processing circuit when a high band signal is detected and the input of the low pass filter is outputted when the high band signal is not detected, and a second switch for switching an input signal and an output signal of a band pass filter in response to the high band detection signal so that the output of the band pass filter is outputted to a color signal recorder processing circuit when the high band signal is detected and the input of the band pass filter is outputted to the color signal recording processing circuit when the high band detection signal is not detected.

4 Claims, 3 Drawing Sheets

DOUBLE DECK VIDEO CASSETTE TAPE RECORDER WITH VIDEO SIGNAL PROCESSING CIRCUIT

FIELD OF THE INVENTION

The present invention relates to a double deck video cassette tape recorder, and particularly to a video signal processing circuit of a double deck video cassette tape recorder capable of recording and editing a video signal and an audio signal in one video cassette tape recorder actually having functions of two video cassette tape recorders.

DESCRIPTION OF THE CONVENTIONAL ART

Recently, a camera-integrated video cassette tape recorder, which integrated a camera and a video cassette tape recorder (VCR) in one system, are widely used. Meanwhile, for example, a double deck VCR having functions of two VCRs was introduced in the industry for the purpose of recording and editing (dubbing) in one system.

FIG. 1 shows a block diagram of a conventional double deck VCR. This drawing shows a video signal processing circuit of a double deck VCR having functions of two VCRs 50 and 51 such as a function of editing a tape on which a certain signal is recorded.

In the drawings, reference numeral 50 denotes a reproducing VCR and 51 denotes a recording VCR. The reproducing VCR is a kind of an S-VHS, a VHS-C based on an S-VHS, a VHS signal, or an Hi-8, and the recording VCR generally adapts a VHS method.

In the above-mentioned construction, when running the tape 10, on which a predetermined signal is recorded, in the reproducing VCR 50, a predetermined magnetic signal is generated from a rotary magnetic head 11, and is amplified by a preamplifier 12. The thusly amplified reproducing signal is transmitted to a high pass filter (HPF) 13 for separating a signal applied thereto into a luminance signal and a low pass filter (LPF) 15. In addition, the output of the high pass filter 13 is transmitted to a luminance signal reproducing circuit (Y-processing) 14, and the output of the low pass filter 15 is transmitted to a chrominance signal reproducing circuit (C-processing) 16.

The luminance signal reproducing circuit 14 modulates a luminance signal Y, and performs a deemphasis, a noise erasing, and the like. Meanwhile, the chrominance signal reproducing circuit 16 converts a chrominance signal component C into an original frequency. The outputs of the reproducing circuits 14 and 16 are transmitted to a mixer 17, and to a terminal 18 as a mixed signal.

Meanwhile, in the recording VCR 51, a mixed video signal applied to the terminal 18 is transmitted to a low pass filter LPF 19 and a band pass filter BPF 21, respectively, and separated into a luminance signal and a chrominance signal. The luminance signal is processed to an emphasis which modulated by a luminance signal processing circuit 20 (Y-processing). Meanwhile, the chrominance signal is converted into a low pass frequency by a chrominance signal processing circuit 22 (C-processing). The above-mentioned signals are mixed by a mixer 23, amplified by a recording amplifier 24, and recorded on a magnetic tape 26 by a magnetic head 25.

As described above, the conventional VCR simply consists of a reproducing system and a recording system by using two VCRs provided therein. That is, two VCRs are just internally provided in one system. Meanwhile, in the conventional double deck VCR, a dubbing operation may cause a deterioration of picture. As the camera-integrated VCR has been widely used, an editing function and a high quality of picture in the double deck VCR are necessary; however, the prior art has a disadvantage in satisfying the above-mentioned requirements.

SUMMARY OF THE INVENTION

Accordingly, in is an object of the present invention to provide a double deck video tape cassette recorder, which overcomes the problems encountered in the conventional double deck video tape cassette recorder.

It is another object of the present invention to provide an improved video signal processing circuit of a double deck VCR capable of preventing a deterioration of picture when dubbing.

In order to achieve the above-mentioned objects, there is provided a double-deck video cassette tape recorder having a reproducing video cassette tape recorder and a recording video cassette tape recorder disposed in a single body, wherein the reproducing VCR transmits a luminance signal and a chrominance signal, respectively, to the recording VCR and includes a luminance reproduction processing circuit generating a high band detection signal to be transmitted to the recording VCR, and the recording VCR includes a first switching means for switching an input signal and an output signal of a low pass filter for luminance signal in response to the high band detection signal so that the output of the low pass filter is outputted no a luminance signal recording processing circuit when a high band signal is detected and the input of the low pass filter is outputted when the high band signal is not detected, and a second switching means for switching an input signal and an output signal of a band pass filter in response to the high band detection signal so that the output of the band pass filter is outputted to a color signal recorder processing circuit when the high band signal is detected and the input of the band pass filter is outputted to the color signal recording processing circuit when the high band detection signal is non detected.

DETAILED DESCRIPTION OF THE INVENTION

Figure 1:
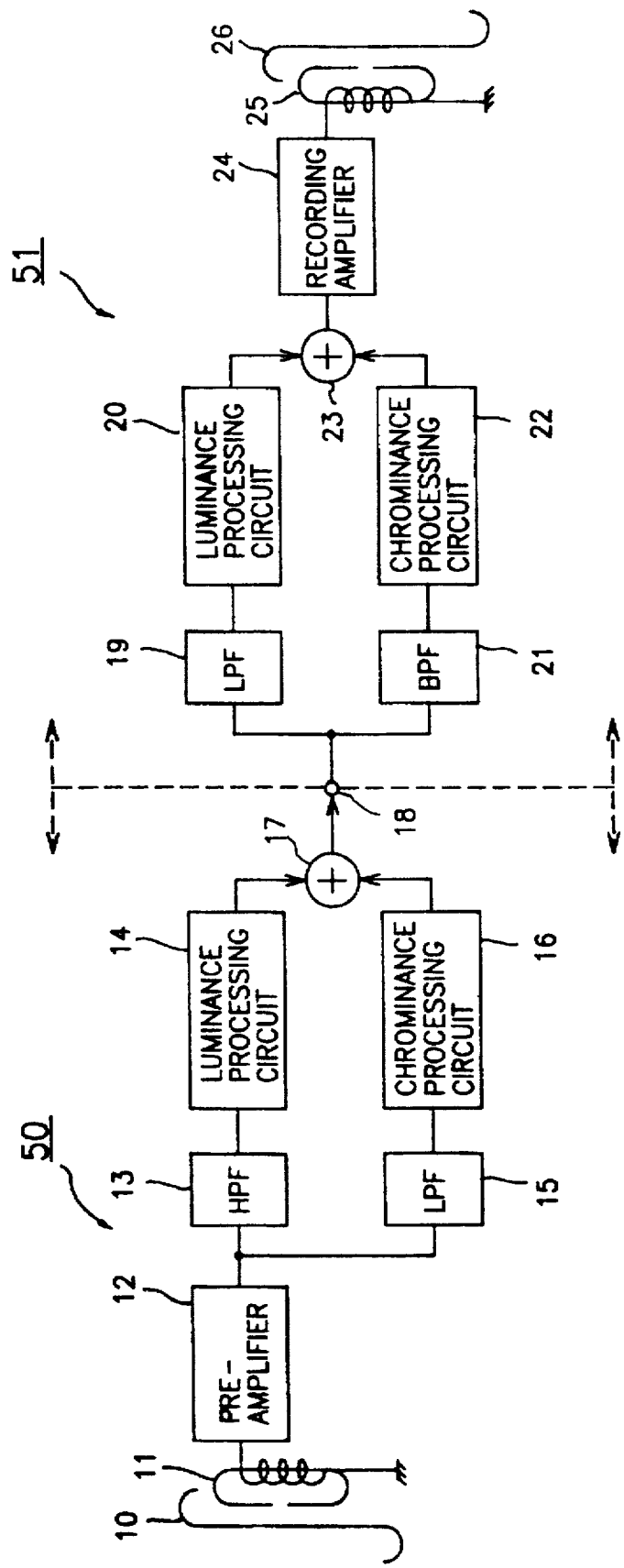
FIG. 1 is a block diagram of a conventional double deck video cassette tape recorder.

In a double deck VCR in which a reproducing VCR and a recording VCR are internally provided, a recording VCR 51a is applied with a luminance signal y and a chrominance signal c from a reproducing VCR 50a, end a high band signal 33 outputted from a luminance signal reproducing circuit 14 in the reproducing VCR is transmitted to a recording VCR.

The recording VCR includes a first switch 32 provided at an output side of a low pass filter 19 for a luminance signal, and the first switch 32 is capable of switching an input signal and an output signal of the low pass filter in accordance with the high band detection signal 33.

In accordance with the switching of the first switch 32, a luminance signal processing circuit 20 is applied with an output of a low pass filter in a high band mode, and an input of a low pass filter in a normal band mode.

In addition, the recording VCR includes a second switch 34 provided at an output side of a band pass filter 21a for a chrominance signal, and the second switch is capable of switching an input of a band pass filter and an output of same in accordance with the high band detection signal.

In accordance with the switching of the second switch 34, a chrominance signal processing circuit 22 is applied with an output of a band pass filter in a high band mode, and an input of a band pass filter in a normal band mode.

In addition, the luminance signal reproducing circuit 14 includes a high band detector 42 for receiving a reproducing signal from a recording head 11 through a high pass filter 13, and for outputting the high band detection signal.

The luminance signal reproducing circuit further includes a normal band equalizer 40 for receiving a reproducing signal from the reproducing head 11 through the high pass filter 13, and a third switch 43 for switching both outputs of the normal band equalizer 40 and the high band equalizer 41, and the third switch is switched between a normal band L and a high band H in accordance with the high band detection signal.

The luminance signal reproducing circuit includes a fourth switch 47 for receiving an output of an FM demodulator 44 through the first and second low pass filters 45 and 46, and here the FM demodulator 44 receives an output of the third switch, and the fourth switch is capable of switching between a normal band L and a high band H in accordance with the high band detection signal.

In this embodiment of the present invention, the reproducing VCR is basically directed to transmitting a luminance signal and a chrominance signal to a recording VCR in a separated state, that is, the signals are not transmitted thereto in a mixed state. The recording VCR includes exclusive separation terminals for a luminance signal and a chrominance signal. In addition, when switches 32 and 34 are switched, and when a luminance signal inputted thereto is for an 8mm signal or a VHS signal, the low pass filter LPF 19 is by-passed, and the signal is inputted to the luminance signal processing circuit 20. Meanwhile, the luminance signal inputted thereto is for a Hi-8 signal or an S-VHS signal, the signal is inputted to the luminance signal recording circuit 20 through the low pass filter 19. The above-described switches are automatically switched in accordance with an output outputted from the high band detector 42 ( FIG. 3) of a reproducing side.

As the switches are arranged in the above-described manner, since a reproducing luminance signal of 8 mm signal or VHS signal outputted from the reproducing VCR is directly inputted to the luminance signal processing circuit, not through the low pass filter 19, a desired picture quality can be achieved.

Figure 2:
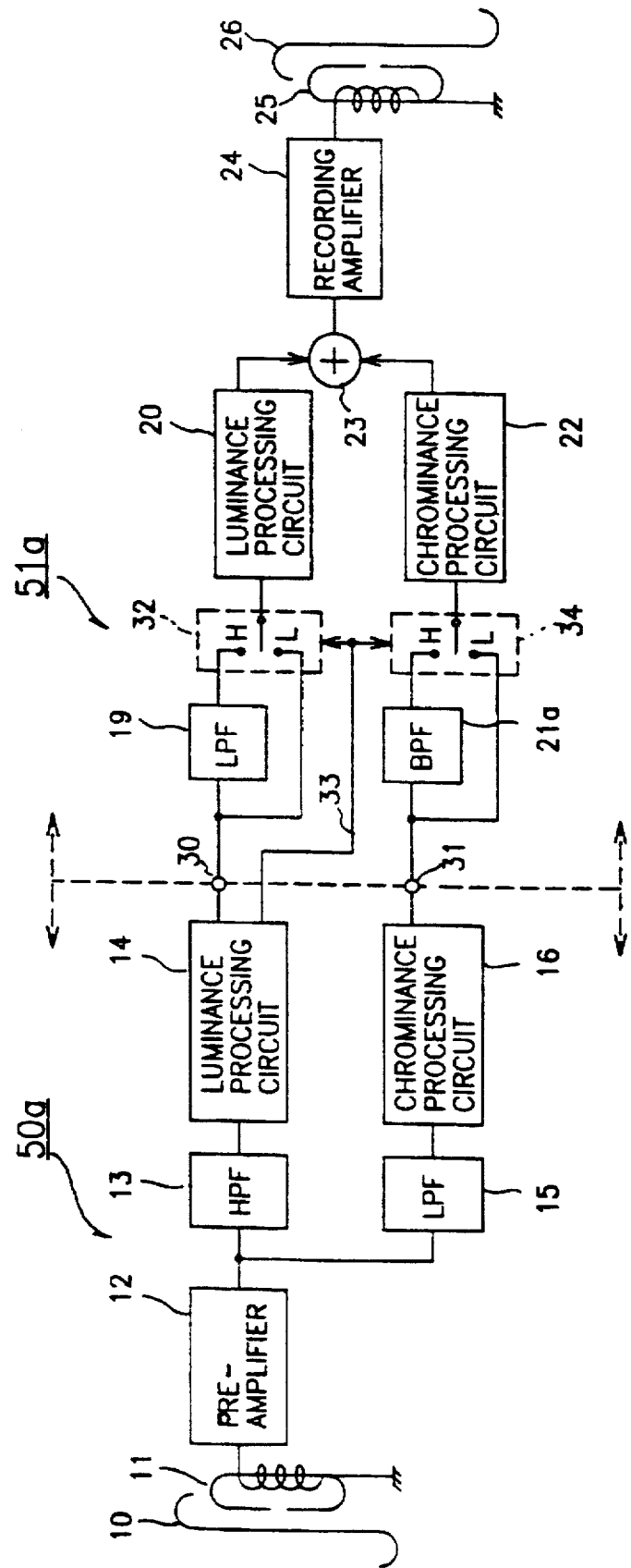
FIG. 2 is a block diagram of a double deck video cassette tape recorder of an embodiment of the present invention.

FIG. 2 shows a block diagram of a first embodiment of the present invention. The same reference numerals as the conventional art of FIG. 1 is given in the present invention. The luminance signal reproducing circuit 14 outputs a judgement signal for judging a certain signal between S-VHS and VHS in the VHS-C method. In case of an 8-mm method, a judging signal is outputted for Judging a signal between a Hi-8 method or 8-mm method, and in case of the 8-mm method, a judging signal for Judging a signal between a Hi-8 method or an 8-mm method is outputted, and it is used as a control signal for the switches 32 and 34.

The terminals 30 and 31 are exclusively for a reproducing luminance signal and a reproducing chrominance signal, respectively.

The switch 32 is connected to an input terminal of the luminance signal recording circuit 20, and a selected terminal is connected to the output terminal of the low pass filter 19, and another terminal is connected to the input terminal of the low pass filter 19. Meanwhile, the switch 34 is connected to the input terminal of the chrominance signal recording circuit 22, and a selected terminal is connected to the output terminal of the band pass filter (BPF) 21a, and another is connected to the input terminal of the band pass filter 21a.

Figure 3:
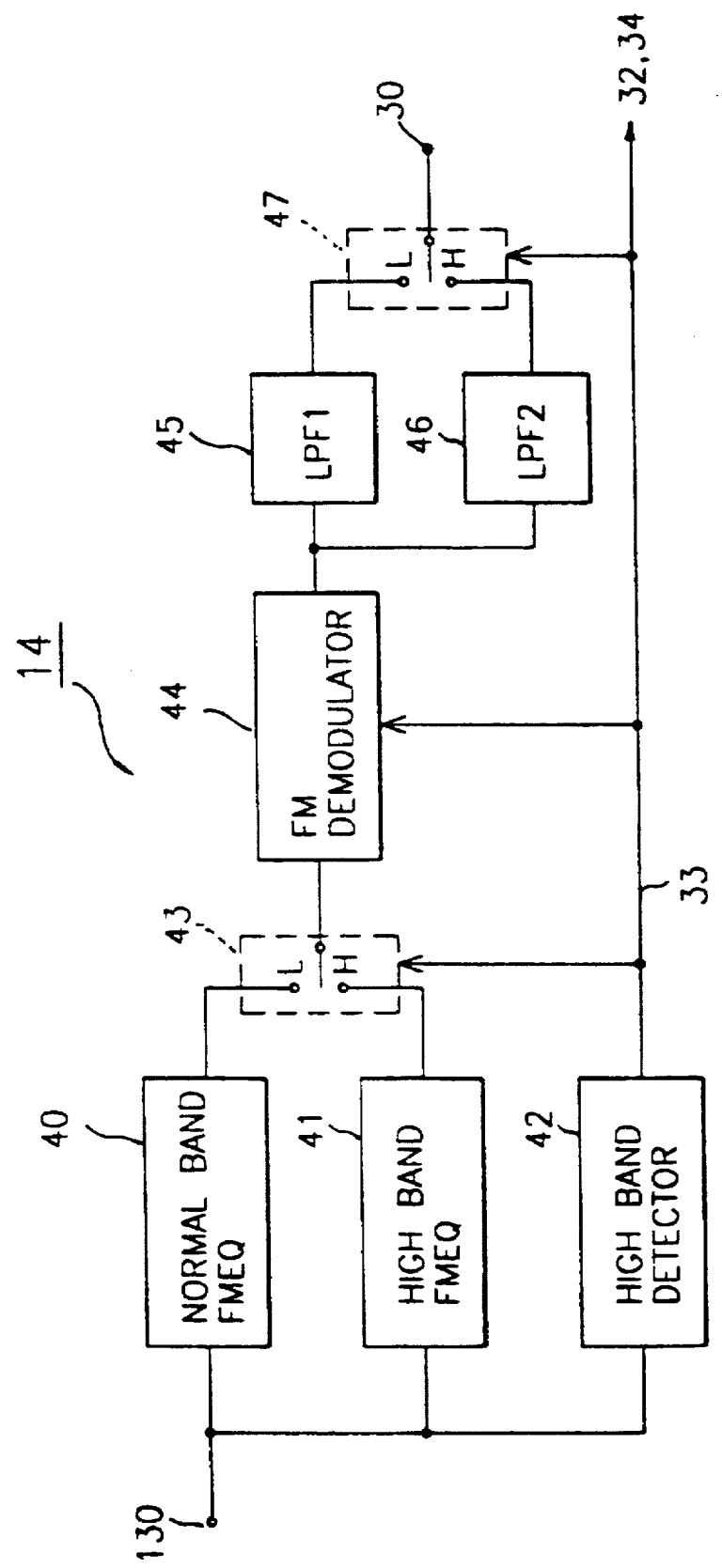
FIG. 3 is a block diagram of e luminance signal reproducing circuit of FIG. 2 according to the present invention.

FIG. 3 shows a detailed block diagram of a luminance signal reproducing circuit 14 of FIG. 2. The luminance signal reproducing circuit 14 is directed to generating a control signal with respect to the switches 32 and 34 in cooperation with a signal line 33. In the drawings, reference numerals 40 and 41 denote equalizer circuits (high band FMEQ) for compensating a high band component of FM signal which is lost by a magnetic tape and a magnetic head, of which 40 denotes a normal band, and 42 denotes a detection circuit for judging a carrier of the reproducing FM signal, and 43 denotes a switch 43, and 44 denotes an FM demodulating circuit, and 45 and 46 denote low pass filters LPF 1 and LPF2 for removing unnecessary carriers after demodulation.

The operation of the double deck video cassette tape recorder will now be explained.

In the following explanation, a VCR 50a is referred to an 8-mm method, and a general system is referred to a normal band, and an Hi-8 method is directed to a high band. In addition, a memory-type VCK is referred to a VHS method, and it is impossible to record in the S-VHS method. However, since the reproducing VTR is referred to a VHS-C method, and it is possible to switch between a VHS method and an S-VHS method.

Referring to FIG. 2, a reproducing signal is outputted from a tape 10, on which a certain signal is recorded, in cooperation with a magnetic head 11, and is amplified to a predetermined level. The amplified reproducing signal is referred to a mixed state of a chrominance signal which is low-band-converted and a luminance signal which is FM-modulated. A low-pass-converted chrominance signal is outputted by the low pass filter 15.

In case of the 8-mm method, a low-pass chrominance signal is referred to 734 KHz±0.5KHz, and an FM luminance signal is referred to 4.2–5.4 MHZ (normal band) and 5.7–7.7 MHZ (high band). Since the chrominance signal shares a normal band and a high band, the chrominance signal reproducing circuit 16 which is followed by the low pass filter 15 is common. The normal band and high band of a recording FM frequency of the luminance signal reproducing circuit 14 ere different (that is, since there is a certain difference, they are called as a normal band and a high band).

Referring to FIG. 3, an PM signal inputted thereto from the high pass filter 13 through the terminal 130 is inputted to a normal FM equalizer FMEQ 40, a high band FM equalizer FMEQ 41, and a high band detector 42. The high band detector 42 detects a normal band and a high band by eliminating a predetermined portion corresponding to a horizontal synchronous signal among FM signals using a characteristic that a horizontal synchronous signal unit (not shown) among video signals is not changed in accordance with a picture condition.

Meanwhile, the normal and high band equalizers 40 and 41 are directed to compensating a high band component of an FM signal which is lost in a magnetic tape and magnetic head system. The output side of the normal and high band equalizers 40 and 41 is connected to a low terminal L or a high terminal H of the switch 43, and the low terminal L and the high terminal H are switched in accordance with a control signal outpoured from the high band detector 42.

The signal of the switch 43 is demodulated by the FM demodulator 44. Since the demodulation sensitivity of the normal band and the high band are different from each other, the switching operation of the switch 43 is performed in accordance with a control signal outputted from the high band detector 42. The output of the FM demodulator 44 is in the original video signal; however, it is outputted in cooperation with the low pass filter (LPF1) 45 and a low pass filter (LPF2) 46. The above-mentioned output side is connected to the selection terminals L and H of the switch 47. The switch 47 is switched in accordance with a control signal outputted from the high band detector 42.

The reason that there is a difference between the low pass filter (LPF1) 45 and the low pass filter (LPF2) 46 is due to the difference of the modulation frequency. At the side of the low pass filter (LPF2) 46, a cut-off frequency is set higher.

A luminance signal is outputted from the switch 47. The number of horizontal resolution scanning lines of the luminance signal inputted to the terminal 30 is about 240 in a normal band, and is about 400 in a high band. A control signal of the output of the high band detector 42 is outputted in cooperation with a signal line 33 for controlling the switches 32 and 34 (FIG. 2). The operation of the recording VCR 51a will now be explained.

The reproducing luminance signal outputted from the luminance signal reproducing circuit 14 through the terminal 30 is inputted to the low pass filter 19 and the switch 32 respectively. The output of the low pass filter 19 is inputted to the selection terminal of the switch 32. The switch 32 connected to the luminance signal processing circuit 20, and the signal passed therethrough is inputted to the adder 23 by receiving an FM modulation based on the VHS method.

In the switch 32, a VHS recording method is basically directed to separating a luminance signal and a chrominance signal in cooperation with a low pass filter LPF 19 and a band pass filter BPF 21, and the signals are inputted to the luminance signal processing circuit 20 and the chrominance signal processing circuit 22, respectively. Here, =he low pass filter 19 includes more then 40dB in 3.58MHz of a chrominance carrier frequency in the NTSC so as to less interfere the chrominance signal. That is, due to the above-mentioned reason, it is reduced more than 40dB in 3MHz. As described above, the band-limited luminance signal is converted into an FM modulation type of a VHS standard. In addition, the lower portion of the FM frequency wave is processed by the high pass filter (not shown) of the luminance signal recording circuit so as to prevent any interference in a chrominance signal (629MHz±0.5MHZ) which is low-band-converted when recording. Therefore, the number of horizontal resolution scanning lines referred to the recorded/reproduced luminance signal is 240.

In case of reproducing using the 8-mm VCR, since the luminance signal of a normal band inputted to the terminal 30 is processed in the VHS method when recording, the high portion of the luminance signal is reduced more when it is processed by the low pass filter 19. Therefore, there is provided a switch which bypasses the low pass filter 19 in the normal band.

Meanwhile, a high band signal having the number of scanning lines more than 400 (a high resolution) is inputted to the terminal 30, it is necessary to limit the band using the low pass filter 19. As described above, in the VHS standard, the number of the horizontal resolution scanning lines of 240 can be reproduced for the prevention of any interference between the low pass-switching chrominance signal and an FM luminance signal. The control signal of the switch 32, as shown in FIG. 3, is referred to an output of the high band detector of the reproducing VCR.

The chrominance signal inputted to the terminal 31 is processed by the reproducing chrominance signal processing circuit 16, end in case of the NTSC method, it is processed to a chrominance signal of 3.58 MHZ±0.5 MHz. The chrominance signal has the same processing method with respect to a normal band and a high band. When the chrominance signal is processed by the band pass filter 21a, the upper and lower band of the chrominance is reduced. In the normal band, the band pass filter 21a is bypassed, and so it is processed by the switch 34. Here, the band pass filter 21a is explained. But, since there is no difference in concurrently processing the normal band and high band, in the high band, it is not necessary to use the band pass filter 21a. However, in the high band, when the luminance signal passes the low pass filter 19, a predetermined time delay occurs due to the delay of the filter. Therefore, it is necessary to coincide time with the chrominance signal. Therefore, the bands pass filter 21a is referred to a delay line of the high band. That is, the chrominance signal can be recorded irrespective of the band limit in the normal band and high band as compared to the prior art.

As described above, it is possible to record the high band of the luminance signal of the normal band reproducing luminance signal outputted from the recording VCR to the recording VCR in cooperation with the low pass filter 19 of the recording VCR.

In addition, the reproducing signal can be recorded, maintaining side band when reproducing. Therefore, these signals can be dubbed in high resolution as compared to the prior art. In addition, it is possible to dub without losing high band component of the luminance signal component and since band component of the chrominance signal.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A double-deck video cassette tape recorder having a reproducing video cassette tape recorder and a recording video cassette tape recorder disposed in a single body, wherein said reproducing VCR transmits a luminance signal and a chrominance signal separately, to said recording VCR and includes a luminance reproduction processing circuit for generating the luminance signal and a high band detection signal to be transmitted to the recording VCR, and said recording VCR includes a low pass filter receiving the luminance signal at an input and providing an output; first switching means for switching between the input and the output signal of said low pass filter in response to the high band detection signal so that the output of the low pass filter is outputted to a luminance signal recording processing circuit when a high band signal is detected and the input of the low pass filter is outputted when the high band signal is not detected;

a band pass filter receiving the chrominance signal at an input and providing an output;

and second switching means for switching between the input and the output signal of said band pass filter in response to the high band detection signal so that the output of the band pass filter is outputted to a color signal recorder processing circuit when the high band signal is detected and the input of the band pass filter is outputted to the color signal recording processing circuit when the high band detection signal is not detected.

2. The double deck VCR of claim 1, wherein said luminance signal reproduction processing circuit includes a high band detector for receiving a reproducing signal of a magnetic head through a high pass filter and for outputting the high band detection signal.

3. The double deck VCR of claim 1, wherein said luminance signal reproduction processing circuit includes a third switch for switching outputs of a normal band equalizer and a high band equalizer receiving a reproducing signal of a magnetic head through a high pass filter, and said third switch is directed to switching between a normal band and a high band in cooperation with the high band detection signal.

4. The double deck VCR of claim 3, wherein said luminance signal reproduction processing circuit includes a fourth switch for receiving an output of an FM demodulator, which receives an output of said third switch through one of two respective low pass filters, and wherein said fourth switch is directed to switching between a normal band and a high band.

* * * * *